United States Patent
Yamada et al.

(10) Patent No.: US 6,845,073 B2
(45) Date of Patent: Jan. 18, 2005

(54) PLAYBACK APPARATUS FOR DISPLAYING ANGULAR POSITION BASED ON REMAINDER CORRESPONDING TO ELAPSED TIME

(75) Inventors: Yoichi Yamada, Saitama-ken (JP); Tomohiko Kimura, Saitama-ken (JP); Koichiro Sakata, Saitama-ken (JP); Takeaki Funada, Saitama-ken (JP); Hiroyuki Isobe, Saitama-ken (JP); Junichi Takagaki, Saitama-ken (JP); Tetsuya Kikuchi, Saitama-ken (JP); Gen Inoshita, Tokyo (JP); Ko Atsumi, Tokyo (JP)

(73) Assignee: Pioneer Corporation, Tokyo (JP)

( * ) Notice: Subject to any disclaimer, the term of this patent is extended or adjusted under 35 U.S.C. 154(b) by 429 days.

(21) Appl. No.: 10/151,952

(22) Filed: May 22, 2002

(65) Prior Publication Data
US 2002/0176343 A1 Nov. 28, 2002

(30) Foreign Application Priority Data
May 22, 2001 (JP) ........................................ 2001-152227

(51) Int. Cl.$^7$ .......................... G11B 27/34; G11B 27/36; G11B 33/10
(52) U.S. Cl. ............................... 369/53.39; 369/53.31; 369/53.24
(58) Field of Search .......................... 369/53.39, 53.31, 369/53.24

(56) References Cited

U.S. PATENT DOCUMENTS 4,130,842 A * 12/1978 Gallo et al. .................... 386/61
5,959,280 A * 9/1999 Kamatani .................... 369/52.1
6,415,095 B1 * 7/2002 Morishima et al. ............ 386/55
6,519,408 B2 * 2/2003 Nagata et al. ................. 386/46
2002/0137565 A1 * 9/2002 Blanco ......................... 463/46

OTHER PUBLICATIONS

DJZONE, DJ Magazine Breaking News, XP-002273763, Mar. 16, 2004, pp. 1–2, www.djzone.net.

Pioneer Compact Disc Player CDJ-1000, XP-002273764 Operating Instructions, pp. 1–20, Copyright 2001.

* cited by examiner

Primary Examiner—Gautam R. Patel
(74) Attorney, Agent, or Firm—Arent Fox

(57) ABSTRACT

An information playback apparatus is provided, which displays the status of playback in a way more suitable to the human sense as well as detects and then displays as new information the feature characteristic of audio information such as a music selection. The frequency of occurrence of variations in amplitude of audio information to be played back is measured at each predetermined frequency. The measured frequency of occurrence is displayed in a predetermined area of a display unit as the feature information of beat densities with respect to the playback elapsed time of the audio information to be played back. An index display unit is displayed in a substantially circular playback speed display unit. The amount of audio information to be sequentially played back corresponding to elapsed time is divided by a predetermined value to determine a remainder. The index display unit is displayed at an angular position corresponding to the remainder, while being rotatably moved along a virtual track, thereby displaying the status of playback.

2 Claims, 6 Drawing Sheets

PLAYBACK APPARATUS FOR DISPLAYING ANGULAR POSITION BASED ON REMAINDER CORRESPONDING TO ELAPSED TIME

BACKGROUND OF THE INVENTION

1. Field of the Invention

The present invention relates to information playback apparatus which play back audio information such as music selections or sounds supplied from sources such as CDs (Compact Discs) or DVDs (Digital Versatile Discs). More particularly, the present invention relates to an information playback apparatus which indicates the status of playback of audio information or features contained in the audio information.

The present application claims priority from Japanese Application No. 2001-152227, the disclosure of which is incorporated herein by reference for all purposes.

2. Description of the Related Art

Conventionally, information playback apparatus such as CD players or DVD players are designed to indicate various pieces of information, such as the status of playback of audio information, on the display while playing back audio information which is stored in CDs or DVDs.

For example, it is commonly practiced to display in digital form the elapsed track time indicative of the playback elapsed time of a music selection being currently played back or the remaining time of playback of the music selection being currently played back.

That is, suppose that a music selection of a plurality of music selections stored on a musical CD is being played back. In this case, for example, when the elapsed time from the starting point of the music selection is two minutes and 30 seconds, a numerical indication of elapsed track time "2:30" is provided. In addition, when the music selection requires a total of playback time of three minutes, a numerical indication of the remaining time of 30 seconds is provided as "0:30."

Accordingly, the user can look at the indication of elapsed track time which varies every moment, thereby allowed to know the status of playback of the audio information. That is, since the numerical values indicating the elapsed track time vary every moment, the user can look at the variations in numerical value changing every moment, thereby allowed to know the status of playback of the audio information.

It is also commonly practiced to display the frequency characteristics of playback sounds which are produced by playing back audio information, thereby providing the user with the feature of the frequencies contained in the playback sound. That is, the frequency spectrum of playback sounds is displayed over the entire audio frequency band in real time.

The conventional information playback apparatus allows the user to know the status of playback from variations in numerical value of the elapsed track time. However, it is practically difficult to see the status of playback readily or by intuition by looking at numerical values which vary every moment. That is, when the user looks at the numerical value indicative of the elapsed track time which changes from a value to another, his or her human sense cannot help much understand the status of playback by intuition.

Additionally, consider the information playback apparatus which displays in real time the frequency spectrum of playback sounds over the entire audio frequency band. In this case, what is done by the apparatus is just to indicate the frequency spectrum of the current playback sound which is being delivered from a loudspeaker or headphone. That is, only the frequency spectrum of a momentary playback sound is displayed as a variation in level within the audio frequency band.

In this context, suppose that the user wishes to know the entire feature of a music selection from beginning to end by playing back a musical CD, for example. In this case, it is difficult to know the overall feature of the music selection by watching the a frequency spectrum of playback sounds which changes every moment.

More specifically, a music selection contains features such as "chorus" or a portion of feeling which strongly appeals to human sense, an introductory portion provided to emphasize the portion or "chorus", and an ending which makes the music selection suggestive. Music and words of the music are composed such that these various features are organically related to each other to appeal to the user's sense. However, it was impossible to know the aforementioned various features of the entire music selection only by looking at the frequency spectrum of playback sounds which changes every moment.

SUMMARY OF THE INVENTION

The present invention was developed in view of such conventional problems. It is therefore the object of the present invention to provide an information playback apparatus which displays the status of playback in a way more suitable to the human sense and detects the specific feature of audio information such as a music selection to display the feature as an amount of new information.

To achieve the aforementioned object, the present invention provides an information playback apparatus for displaying the status of playback of audio information to be played back. The information playback apparatus comprises an operating unit for determining the value of a remainder provided by dividing an amount of the audio information to be played back sequentially corresponding to elapsed time by a predetermined value. The information playback apparatus further comprises a display unit for providing a predetermined display moving along a substantially circular virtual track in a circumferential direction. The information playback apparatus is further characterized in that the display unit provides the display at an angular position in the circumferential direction associated with the value of the remainder determined sequentially by the operating unit corresponding to the elapsed time, thereby moving the display along the virtual track.

The aforementioned information playback apparatus is also characterized in that the predetermined value is determined based on the amount of information in unit time and a rotational speed of an analog record player.

According to the information playback apparatus of the present invention having such a configuration, the aforementioned display at the display unit moves along a substantially circular virtual track in the circumferential direction in response to the progress of playback of audio information. This makes it possible for the user to know the status of playback by intuition as if the user was looking at a rotating analog record disc.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Now, an information playback apparatus according to an embodiment of the present invention will be explained below with reference to the accompanying drawings. As an embodiment, described is an information playback apparatus, such as a car-based audio system or home-use audio system, which can provide playback of CDs, DVDs, and MDs (Mini Discs).

Figure 1:
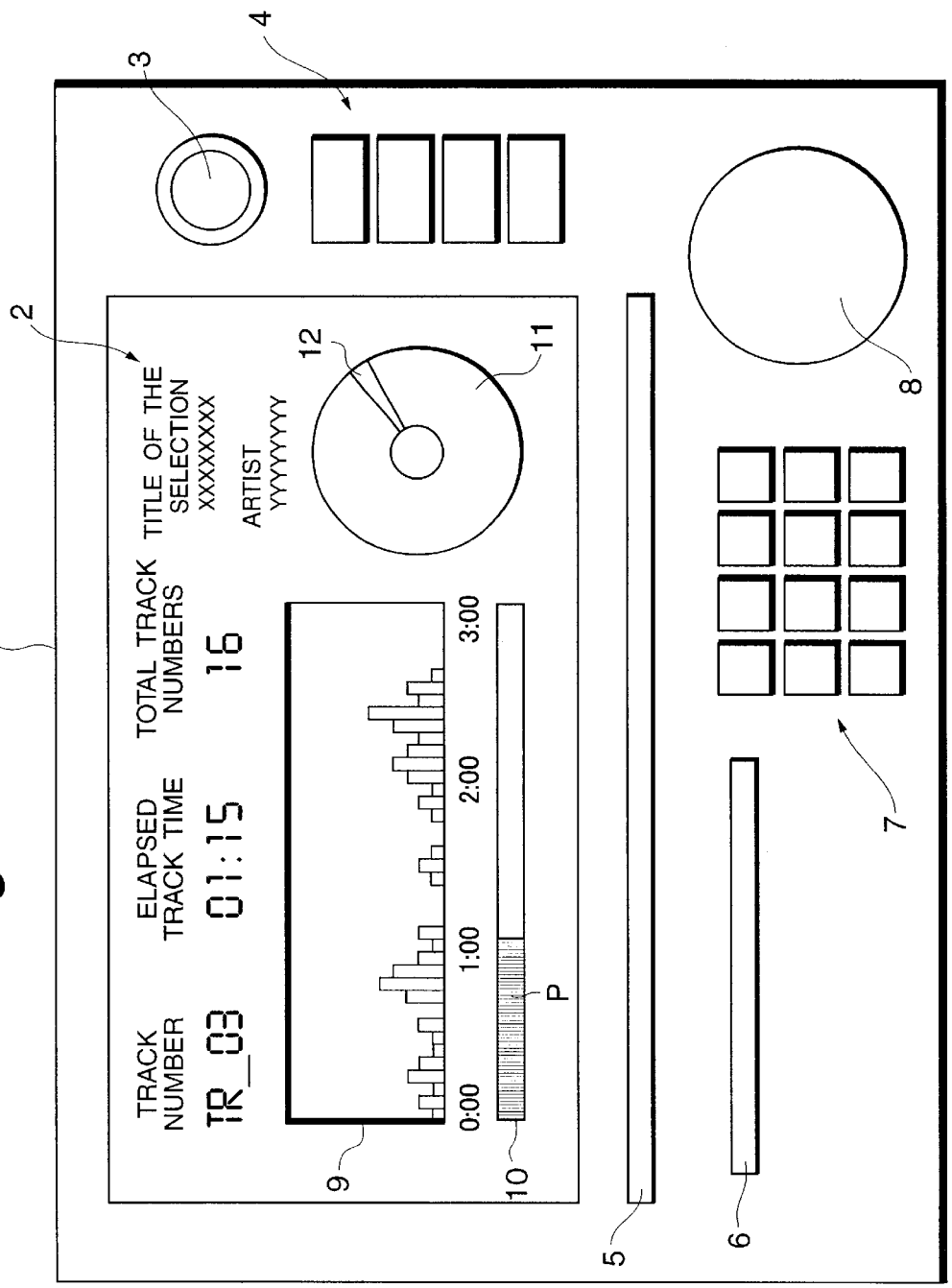
FIG. 1 is a plan view illustrating the outer configuration of an information playback apparatus according to an embodiment.

FIG. 1 is a plan view illustrating the outer configuration of an information playback apparatus according to this embodiment, showing the configuration of a manipulation panel 1 which is provided on the front cabinet of the information playback apparatus to be operated by the user.

In FIG. 1, on the upper portion of the manipulation panel 1, provided is a display unit 2 comprising a dot matrix color liquid-crystal display, while to the right of the display unit 2, provided are a rotational member 3, which is rotatable and called a jog dial, and a plurality of manipulation keys 4 of a pushbutton type.

To the lower portion of the display unit 2, provided are a first slit-shaped disc inlet 5 for detachably inserting a CD or DVD therethrough, and a second slit-shaped disc inlet 6 for detachably inserting a MD therethrough. To the lower portion of the disc inlets 5, 6, provided are a plurality of manipulation keys 7 of a pushbutton type and a volume manipulation key 8 comprising a rotating variable resistor.

Suppose the user inserts a CD or DVD (hereinafter referred to as an optical disc) into the first disc inlet 5. In this case, the optical disc causes an automatic loading mechanism (not shown), provided inside the first disc inlet 5, to be automatically activated to transfer the optical disc to the predetermined clamp position. The optical disc is then loaded onto a hub portion (not shown) provided on the drive shaft of a spindle motor 14, which is described later. When one of the manipulation keys 4, 7 for instructing the process to start or stop playback is depressed, the spindle motor 14 then starts rotating in the predetermined direction, thereby allowing a disc playback unit 13 (see FIG. 6), described later, to play back information (hereinafter referred to as data) stored on the optical disc.

When the manipulation key which has been depressed is depressed again, the spindle motor 14 stops its rotation as well as the disc playback unit 13 stops the playback of the optical disc. When a manipulation key called an eject button is depressed, the aforementioned automatic loading mechanism is brought into an unloading state in which the optical disc located at the clamp position is transferred out of the disc inlet 5.

On the other hand, suppose the user inserts a MD into the second disc inlet 6. In this case, the MD causes an automatic loading mechanism (not shown), provided inside the second disc inlet 6, to be automatically activated to transfer the MD to the predetermined clamp position. Then, a MD playback unit 29 provides playback of the MD. When the predetermined manipulation key called an eject button is depressed, the automatic loading mechanism unloads the MD from the clamp position and then transfers it out of the second disc inlet 6.

The display unit 2 includes a display unit 9 (hereinafter referred to as the "beat density display unit") for displaying the feature of audio information, called the "beat density", during playback of an optical disc or MD. Also included are a display unit (hereinafter referred to as the "elapsed track time display unit") for displaying the elapsed track time by a length of a horizontal bar graph and a circular display unit 11 (hereinafter referred to as the "playback speed display unit") for displaying the playback speed of audio information.

As shown in the figure, during playback of music selections or the like stored on an optical disc or a MD, displayed on the upper region of the display unit 2 are the total number of tracks indicative of the total number of the music selections stored thereon, the track number indicative of where the music selection being played back is stored, and the elapsed track time indicative of the elapsed time of playback of the music selection being played back. Also displayed are auxiliary information on the music selection being played back, such as the title of the music selection and the name of its composer (artist name).

Prior to the explanation of the configuration of the disc playback unit 13 provided on the information playback apparatus, now described are the functionalities of the jog dial 3, the beat density display unit 9, the elapsed track time display unit 10, and the playback speed display unit 11 with reference to FIGS. 2 to 5.

Figure 2:
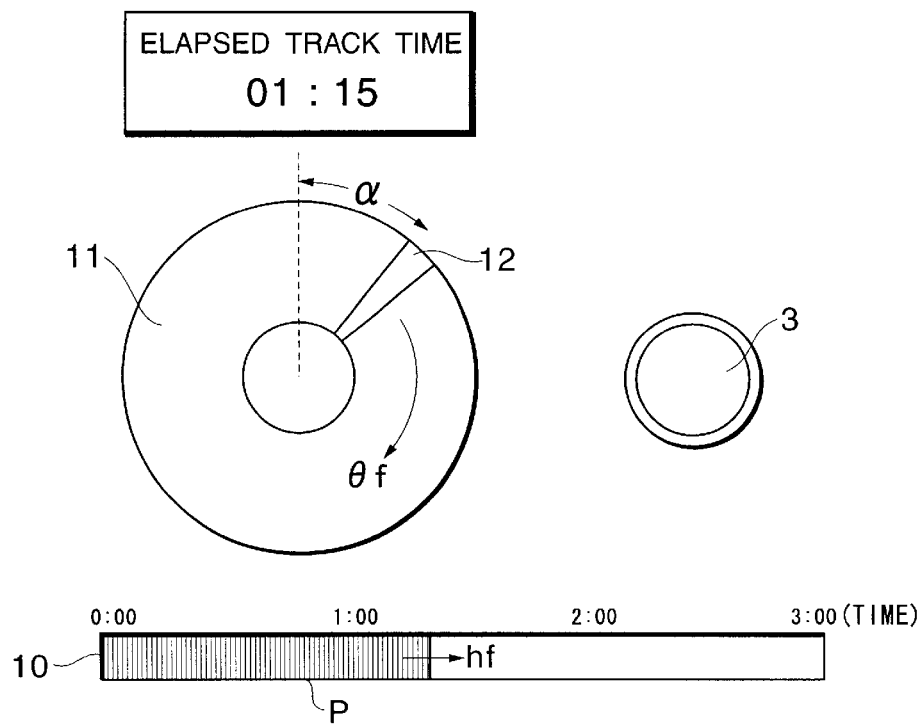
FIG. 2 is an explanatory view illustrating the functions of a jog dial, a beat density display unit, an elapsed track time display unit, and a playback speed display unit.
Figure 3:
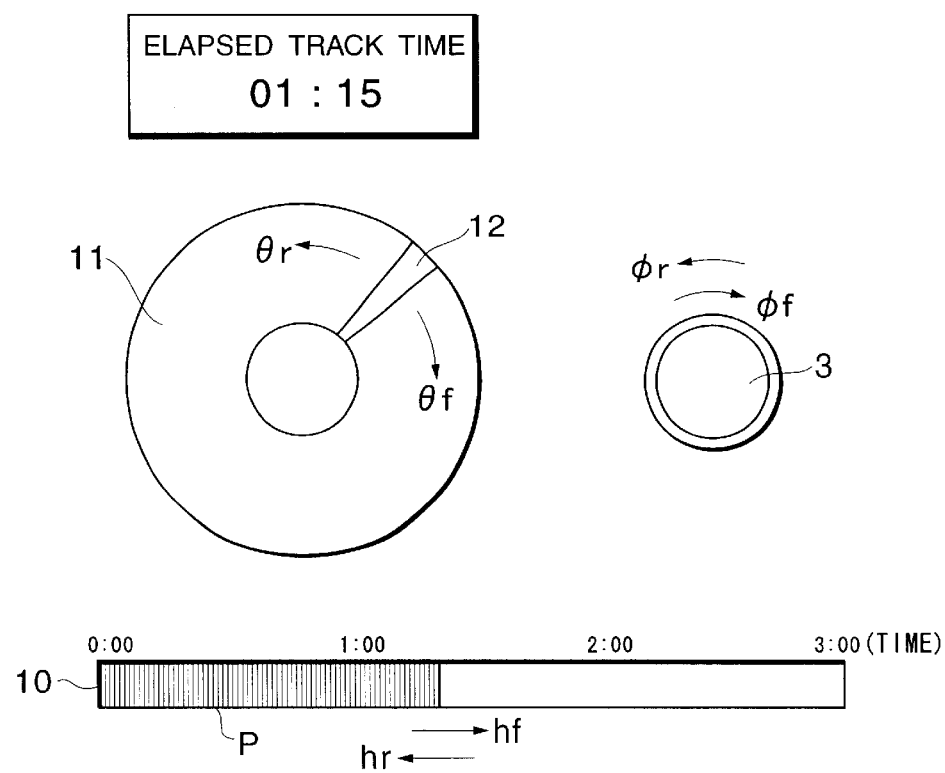
FIG. 3 is another explanatory view illustrating the functions of the jog dial, the beat density display unit, then elapsed track time display unit, and the playback speed display unit.

FIGS. 2 and 3 are explanatory views illustrating the functions of the jog dial 3, the elapsed track time display unit 10, and the playback speed display unit 11.

In FIG. 2, the elapsed track time display unit 10 has a horizontally elongated display area which is used, during playback of a music selection stored on an optical disc or MD, to display the elapsed track time indicative of the playback elapsed time of the music selection being played back, by the length of a bar-shaped extendable and retractable display unit P.

As an example, suppose that the total playback time of a music selection being played back is three minutes. In this case, a period of three minutes is allocated horizontally to the elapsed track time display unit 10 from its one end to the other, with specific points in time being displayed in numerical form. As the playback time elapses, the bar-shaped display unit P gradually increases in length in the direction indicated by arrow hf. This makes it possible for the user to readily know the elapsed track time only by associating the points in time indicated in the numerical form with the length of the bar-shaped display unit P at a glance. Incidentally, the example of FIG. 2 shows a case where the elapsed track time is "one minute and 15 seconds."

The playback speed display unit 11 has a sector-shaped index display unit 12 which is reduced in width at one end and designed to emit light at a high intensity in the background of a circular display area during playback of music selections stored on an optical disc or MD. The index display unit 12 moves in the clockwise direction θf along a circumferential virtual track of the circular display area.

In this configuration, when an analog record disc such as an LP disc is played back with an analog record player, the index display unit 12 moves in the clockwise direction θf at a speed as imitates the predetermined rotational speed at which the analog record disc rotates. That is, the index display unit 12 rotates repeatedly along the circular display area at the same rotational speed as the analog record disc having a predetermined rotational speed of 33 rpm rotates. Therefore, the index display unit 12 rotates repeatedly at a speed of 60/33 seconds per one revolution.

The index display unit 12 is designed to rotate at the predetermined speed when the jog dial 3 is at a standstill without being manipulated.

As described above, the playback speed display unit 11 provides display in imitation of an analog record disc rotating at a predetermined rotational speed. This makes it possible for the user to know the status of playback through intuition only by looking at the movement of the index display unit 12, which is displayed at the playback speed display unit 11.

Now, FIG. 3 shows the display formats of the elapsed track time display unit 10 and the playback speed display unit 11, provided when the jog dial 3 is rotated.

When the user rotates the jog dial 3 in the clockwise direction ∅f, the index display unit 12 starts rotating in response to the rotational angular velocity of the jog dial 3 from where the index display unit 12 was located immediately before the rotational operation. That is, as shown in FIG. 2, when the jog dial 3 is not operated, the index display unit 12 continues to rotate at the aforementioned predetermined speed. In contrast to this, when the jog dial 3 is rotated in the clockwise direction ∅f, the index display unit 12 also rotates in the clockwise direction θf in a one-to-one relationship with the rotational speed.

Furthermore, when the jog dial 3 is rotated in the clockwise direction ∅f, the bar-shaped display unit P in the elapsed track time display unit 10 increases in length in the direction of the arrow hf, shown in the figure, in a one-to-one relationship with the rotational speed.

On the other hand, when the user rotates the jog dial 3 in the counterclockwise direction ∅r, the index display unit 12 starts rotating in response to the rotational angular velocity of the jog dial 3 in the counterclockwise direction ∅r from where the index display unit 12 was located immediately before the rotational operation. That is, as shown in FIG. 2, when the jog dial 3 is not operated, the index display unit 12 continues to rotate at the aforementioned predetermined speed. In contrast to this, when the jog dial 3 is rotated in the counterclockwise direction ∅r, the index display unit 12 also rotates in the counterclockwise direction θr in a one-to-one relationship with the rotational speed.

Furthermore, when the jog dial 3 is rotated in the counterclockwise direction ∅r, the bar-shaped display unit P in the elapsed track time display unit 10 decreases in length in the direction of arrow hr, shown in the figure, in a one-to-one relationship with the rotational speed.

Furthermore, the numerical values of the elapsed track time indicated in digital form in FIG. 1 also increase or decrease in response to the rotational direction and the amount of rotation of the jog dial 3.

When the user stops manipulating the jog dial 3, playback is initiated from the elapsed track time at which the manipulation has been stopped, thereby being brought back into the status which has been described with reference to FIG. 2.

When the user rotates the jog dial 3 as described above, the elapsed track time displayed in digital form and the elapsed track time display unit 10 can be varied in a one-to-one correspondence therebetween in response to the rotational operation. When the user stops the operation, the music selection or the like can be played back from the desired location since playback can be started from the point in elapsed track time at which the operation has been stopped.

In addition, since the index display unit 12 moves as the jog dial 3 rotates, it is possible for the user to know the starting location of playback through intuition only by looking at the movement of the index display unit 12. That is, through an operation of the jog dial 3, the user can obtain just the same feeling of operation as provided by changing the position of a record stylus, relative to an analog record disc being played back with an analog record player, to initiate playback from the desired location.

Figure 4:
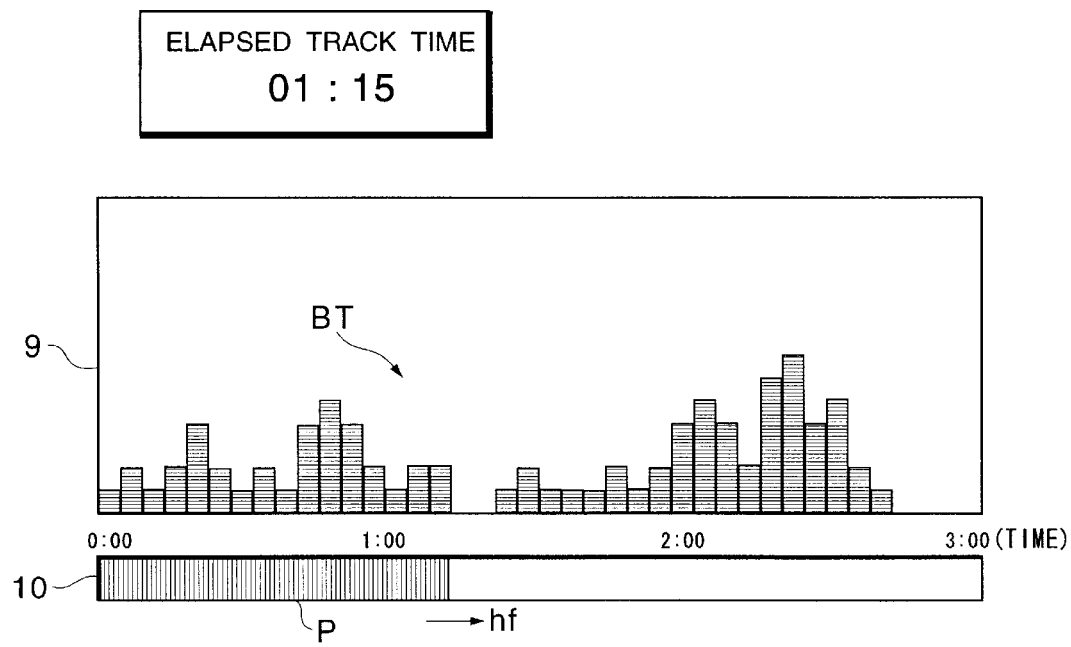
FIG. 4 is a view the display of beat density information.
Figure 5:
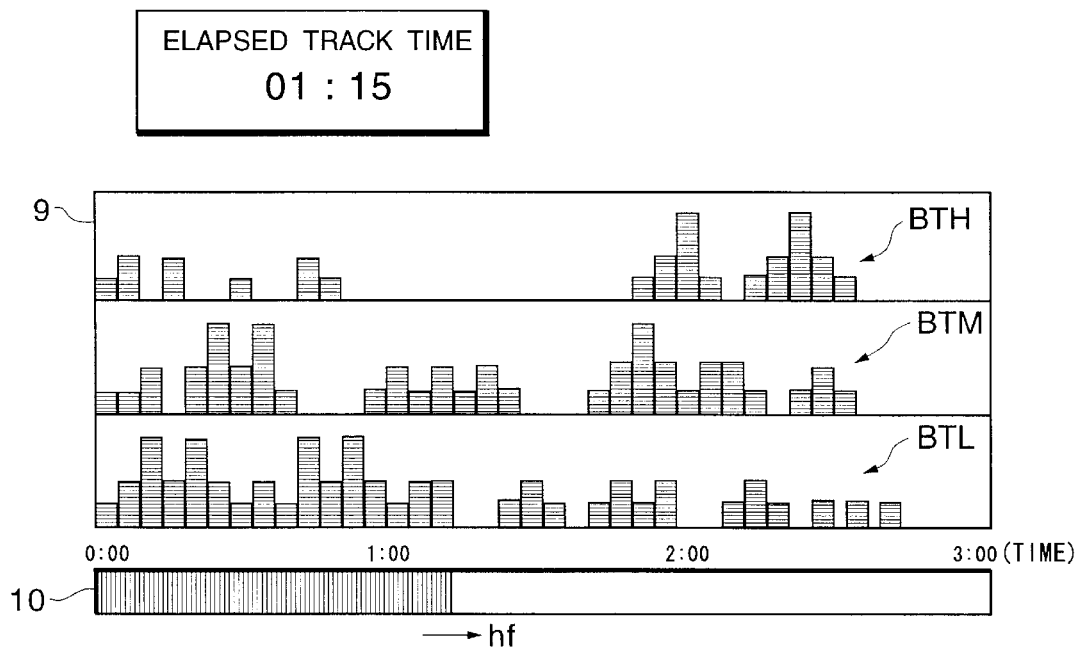
FIG. 5 is another view illustrating the display of beat density information.

Now, FIGS. 4 and 5 are explanatory views illustrating the functionalities of the beat density display unit 9 and the elapsed track time display unit 10.

For example, the beat density display unit 9 displays, at a time, feature information contained in a music selection being played back over the entire music selection. Here, as the feature information, a new piece of information called the "beat density" (hereinafter referred to as the "beat density information"), which is described later, is displayed. The beat density information is displayed as a variation in level along the vertical axis with respect to the time axis (horizontal axis) corresponding to the time displayed in the elapsed track time display unit 10.

There are two types of beat density information as shown in FIGS. 4 and 5, respectively, which the user is allowed to choose to display the desired type of beat density information. Here, the beat density information BT shown in FIG. 4 is feature information, such as a music selection, contained entirely in the audio frequency band (e.g., 0 Hz to 20 kHz). On the other hand, the beat density information BTH, BTM, BTL, shown in FIG. 5, is feature information, such as a music selection, contained in each of the three frequency bands which are provided by dividing the audio frequency band (e. g., 0 Hz to 20 kHz) into a high, middle, and low region.

As described above, a new piece of feature information or the beat density information is displayed at a time over the entirety of a music selection, thereby making it possible for the user to know the overall feature of the music selection through intuition.

Furthermore, as described above, the beat density information is displayed corresponding to the elapsed track time display unit 10. This makes it possible for the user to know the feature of a music selection in relation to the elapsed track time only by looking at the length of the bar-shaped display unit P in the elapsed track time display unit 10. When the user manipulates the jog dial 3 to align the length of the bar-shaped display unit P with the desired position in the beat density information, the user can start playback from the desired point in elapsed track time. For example, the user can readily perform such an operation as to select a "chorus" portion in the music selection being played back and then start playback.

Figure 6:
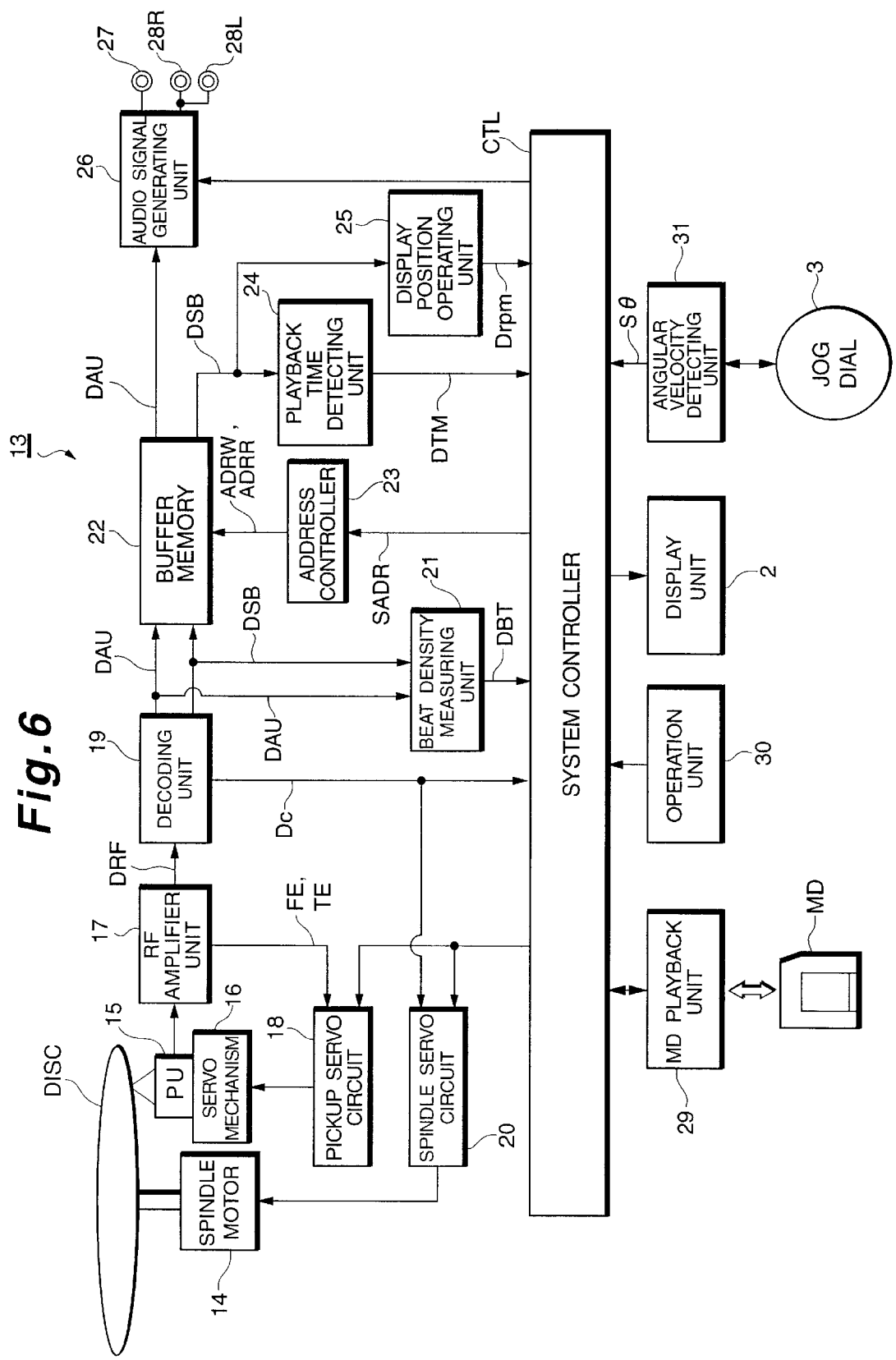
FIG. 6 is a block diagram illustrating the configuration of a disc playback unit.

Now, referring to FIG. 6, described is the configuration of the disc playback unit 13 provided in the information playback apparatus.

In the figure, at the clamp position described above, provided are the spindle motor 14 for rotating an optical disc DISC in the predetermined direction and a pickup 15 for optically reading data stored on the optical disc DISC to deliver a resulting read signal. Also provided is a servo mechanism 16 for servo controlling the pickup 15 to move it back and forth in the radial direction of the optical disc DISC to perform optical reading in a proper manner.

Furthermore, the disc playback unit 13 is provided with an RF amplifier unit 17 and a pickup servo circuit 18. When the RF amplifier unit 17 generates an error signal such as focus error signal FE or tracking error signal TE from the read signal delivered by the pickup 15, the pickup servo circuit 18 performs feedback control on the servo mechanism 16 in order to prevent errors such as a focus error or tracking error.

The pickup servo circuit 18 controls the operation of the servo mechanism 16 in order to move the pickup 15 to a record track of the optical disc DISC in accordance with an instruction provided by a system controller CTL.

The RF amplifier unit 17 generates an RF signal DRF from the data stored on the optical disc DISC in accordance with a read signal delivered by the pickup 15 and then supplies the RF signal DRF to a decoding unit 19.

The decoding unit 19 decodes the RF signal DRF in accordance with the format specified for each optical disc DISC in order to separately extract audio stream DAU and control data Dc contained in the RF signal DRF, and then decodes the audio stream DAU to supply the resulting signal to a beat density measuring unit 21 and a buffer memory 22 as well as the control data Dc to the system controller CTL.

At this stage, various pieces of control data such as sync data and sub-code data which are stored inclusively in the audio stream DAU as the control data Dc are separately extracted. The decoding unit 19 then supplies the sub-code data DSB, contained in the control data Dc, to the beat density measuring unit 21 and the buffer memory 22 in sync with the audio stream DAU.

Furthermore, the sync data is supplied from the decoding unit 19 to a spindle servo circuit 20. This causes the spindle servo circuit 20 to detect an error in the sync data on the rotational speed of the spindle motor 14 provided by an instruction of the system controller CTL, and then perform feedback control on the rotation of the spindle motor 14 to prevent the error.

Figure 7:
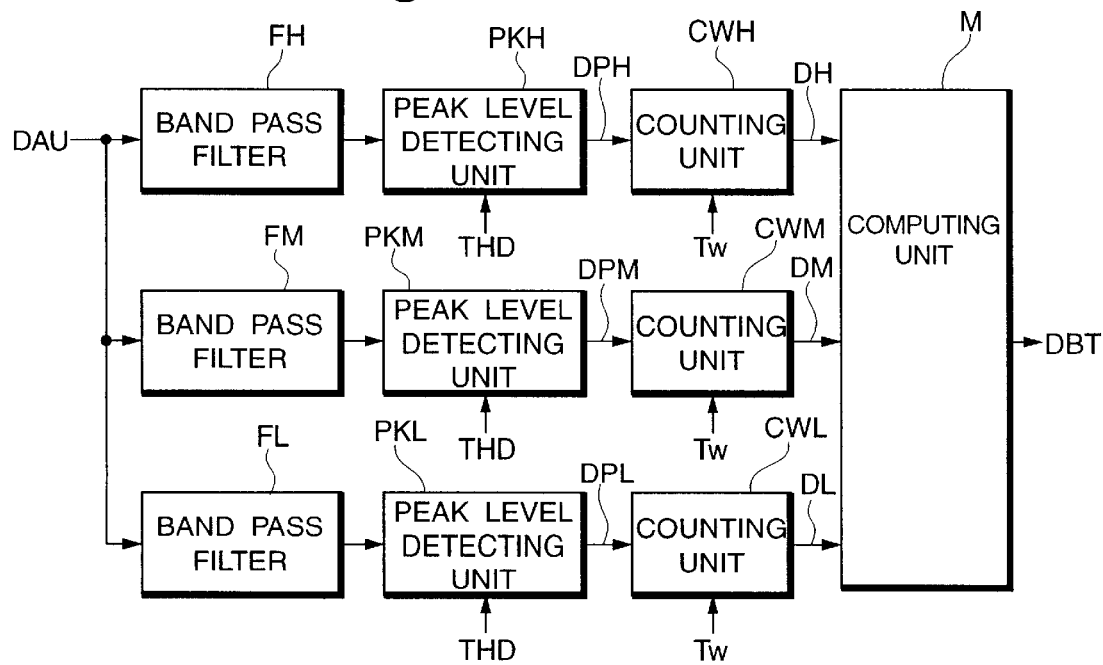
FIG. 7 is a block diagram illustrating the configuration of a beat density measuring unit.

As shown in FIG. 7, the beat density measuring unit 21 comprises band pass filters FH, FM, FL; peak level detecting units PKH, PKM, PKL; counting units CWH, CWM, CWL; and an operational unit M.

Here, the band pass filter FH is made up of a digital filter which allows the frequency band of the high region in the high, middle, and low regions, into which the audio frequency band (e.g., 0 Hz to 20 kHz) is divided, to pass therethrough. The band pass filter FM is made up of a digital filter which allows the frequency band of the middle region to pass therethrough, while the band pass filter FL is made up of a digital filter which allows the frequency band of the low region to pass therethrough.

The band pass filters FH, FM, FL divide the audio stream DAU, supplied from the decoding unit 19, in terms of frequency into high, middle, and low frequency components, which are in turn supplied to the peak level detecting units PKH, PKM, PKL.

Figure 8:
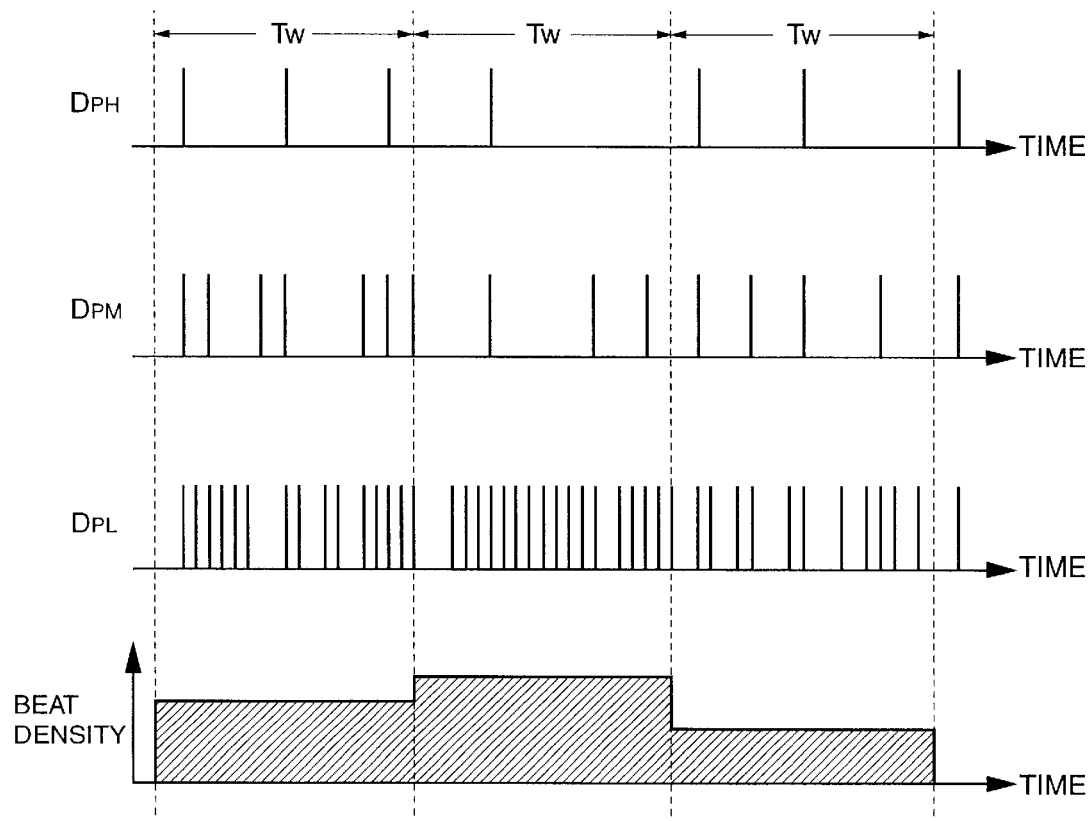
FIG. 8 is a view illustrating a process for generating a beat density in the beat density measuring unit.

The peak level detecting unit PKH compares a high frequency component supplied by the band pass filter FH with predetermined threshold level THD, employed to eliminate noise components, to detect a peak level in the high frequency component greater than the threshold level THD, thereby delivering binary logic data DPH as exemplified in FIG. 8. Similarly, the peak level detecting units PKM, PKL also compare middle and low frequency components supplied by the band pass filters FM, FL with predetermined threshold levels THD, respectively, to detect peak levels in the middle and low frequency components greater than the threshold levels THD, thereby delivering binary logic data DPM, DPL, respectively, as exemplified in FIG. 8.

As exemplified in FIG. 8, the counting units CWH, CWM, CWL divide the logic data DPH, DPM, DPL into a predetermined time width Tw, respectively, and then count the number of logic ones on which the logic data DPH, DPM, DPL takes in each of the time width Tw. That is, by counting the number of logic ones on which the logic data DPH, DPM, DPL takes in each of the time width Tw, the feature of each of the high, middle, and low frequency components is determined as the frequency of occurrence of the logic data DPH, DPM, DPL, respectively. Then, counts DH, DM, DL which are determined for each of the time width Tw are supplied to the operational unit M.

The operational unit M comprises operational circuits for performing four fundamental operations of arithmetic. The operational unit M performs operations of multiplication and addition expressed by the following equation (1), thereby determining the bead density data DBT indicative of the aforementioned beat density BT to supply the resulting data to the system controller CTL.

$$DBT=(\beta H \times DH)+(\beta M \times DM)+(\beta L \times DL) \quad (1)$$

where the coefficients $\beta L$, $\beta M$, $\beta H$ in equation (1) above are experimentally predetermined and each set at a value which allows for best extracting the feature of beat density in each musical genre such as rock, jazz, pop, and Latin music.

Manipulation of predetermined manipulation keys allows the user to specify each of the coefficients $\beta L$, $\beta M$, $\beta H$ to the operational unit M in accordance with the genre of a music selection, while making it possible to set the coefficients $\beta L$, $\beta M$, $\beta H$ to a given value irrespective of the genre.

The system controller CTL supplies the beat density data DBT, supplied in each of the time width Tw, to the display unit 2. As shown in FIG. 4, this causes the beat density information BT to be displayed in accordance with the beat density data DBT at the beat density display unit 9 in the display unit 2.

Now, suppose that the user has manipulated a predetermined manipulation key to instruct the three pieces of beat density information BTH, BTM, BTL, shown in FIG. 5, to be displayed. In this case, the operational unit M multiplies the counts DH, DM, DL by the coefficients $\beta L$, $\beta M$, $\beta H$, respectively, which are supplied in each of the time width Tw from the counting units CWH, CWM, CWL, and then supplies the resulting values ($\beta H \times DH$), ($\beta M \times DM$), and ($\beta L \times DL$), independent of each other, to the system controller CTL as beat density data DBT. As shown in FIG. 5, this causes the beat density display unit 9 in the display unit 2 to display the beat density information BTH in accordance with a multiplication of ($\beta H \times DH$), the beat density information BTM in accordance with a multiplication of ($\beta M \times DM$), and the beat density information BTL in accordance with a multiplication of ($\beta L \times DL$).

Referring back to FIG. 6, the buffer memory 22 or a ring memory comprising an SRAM of a large capacity (e.g., 64

Mbyte) is designed to sequentially store as a set of package data the audio stream DAU and the sub-code data DSB, which are supplied in sync with each other, onto the write address ADRW which is set by an address controller 23.

Here, the system controller CTL detects the elapsed track time from the sub-code data DSB contained in the control data Dc. Every time the elapsed track time changes, the system controller CTL supplies an address control signal SADR to the address controller 23, thereby allowing the address controller 23 to set the write address ADRW.

The buffer memory 22 stores the package data comprising the audio stream DAU and the sub-code data DSB. Thereafter, when a read address ADRR is set by the address controller 23, the buffer memory 22 retrieves the stored package data from the read address ADRR which has been set as well as separates the original audio stream DAU and the sub-code data DSB for output. The buffer memory 22 supplies the audio stream DAU to an audio signal generating unit 26, and the sub-code data DSB to a playback time detecting unit 24 and a display position operating unit 25.

The system controller CTL determines the read address ADRR which should be set, in accordance with the playback time data DTM delivered from the playback time detecting unit 24, which is described below. Then, the system controller CTL supplies the address control signal SADR to the address controller 23, thereby allowing the address controller 23 to set the read address ADRR.

The playback time detecting unit 24 checks the content of the sub-code data DSB supplied by the buffer memory 22. This causes the audio signal generating unit 26 to detect the elapsed track time corresponding to the audio stream DAU which is being processed and to supply the resulting data to the system controller CTL as the playback time data DTM.

Thus, as described above, the system controller CTL retrieves the current elapsed track time from the playback time data DTM and then instructs the address controller 23 using the address control signal SADR to set the read address ADRR of the package data which should be read from the buffer memory 22, such that no discontinuous playback sounds are generated.

The audio signal generating unit 26 decodes the audio stream DAU supplied by the buffer memory 22 to deliver the resulting audio data to a digital output terminal 27 as in digital form. Alternatively, the audio data is converted with a D/A converter (not shown) into a stereo audio signal having the audio frequency band, and then the resulting signal is delivered to analog output terminals 28R, 28L. Accordingly, with a loudspeaker being connected to the analog output terminals 28R, 28L, music data or the like stored on an optical disc can be sounded as playback sounds.

The display position operating unit 25 calculates the total number of frames N of the music selection being played back, within a period from the starting point in time of playback to the current elapsed track time in accordance with the sub-code data DSB which is supplied from the buffer memory 22 in sequence. That is, the display position operating unit 25 detects time information contained in sub-code data DSB or minutes Min, seconds Sec, and the number of frames Fn to perform the operation shown by the following equation (2), thereby determining the total number of frames N.

$$N = (Min \times 60 \times 75) + (Sec \times 75) + Fn \quad (2)$$

Then, the resulting total number of frames N is divided by a predetermined coefficient K, and then the remainder α is supplied to the display unit 2 via the system controller CTL as position data Drpm.

Here, the coefficient K is a value which is specified for each optical disc. Taking a CD as an example, it is predetermined so that K=135 in accordance with the number of frames of an optical disc per one second equal to 75 and the number of revolutions (the rotational speed) of an analog record player equal to 33 rpm (0.55 revolutions per one second). For DVDs and MDs, equations for determining the total number of frames N and the predetermined coefficient K are specified, respectively.

When positional data Drpm is supplied to the display unit 2, the index display unit 12 is lit at the position in the clockwise direction corresponding to the remainder α with respect to the so-called 12 o'clock position in the playback speed display unit 11 shown in FIG. 2. In other words, the remainder α corresponds to an angle in the clockwise direction with respect to the position of 12 o'clock, with the index display unit 12 being lit at the angular position corresponding to the remainder α.

In this manner, the lapse of playback of an optical disc (a CD) is replaced with the rpm (rotational speed) of an analog record player, thereby allowing the rpm to be displayed on the index display unit 12.

The system controller CTL comprises a microprocessor (MPU) to execute a system program which is pre-set therein, thereby centrally controlling the entire operation of the information playback apparatus.

The system controller CTL is connected with a control unit 30 comprising the display unit 2, the MD playback unit 29, the plurality of manipulation keys 4, 7, and the volume manipulation key 8 as well as with an angular velocity detecting unit 31 for detecting the rotational direction and rotational speed (angular velocity) of the jog dial 3.

The angular velocity detecting unit 31 optically detects the rotational direction and rotational speed of the jog dial 3 using a rotary encoder circuit (not shown) and then supplies the detection data Sθ to the system controller CTL. This allows the system controller CTL to recognize the amount of operation (rotational direction and angular velocity) of the jog dial 3 which is provided by the user. Then, using the address control signal SADR, the system controller CTL instructs the address controller 23 to set the read address ADRR corresponding to the amount of operation of the jog dial 3.

That is, when having determined by checking the detection data Sθ that the jog dial 3 has not been rotated, the system controller CTL instructs the address controller 23 to set the read address ADRR which should be set, in accordance with the playback time data DTM supplied by the playback time detecting unit 24. In contrast to this, when having determined that the jog dial 3 has been rotated, the system controller CTL instructs the address controller 23 to set the read address ADRR which should be set, in response to the amount of rotation of the jog dial 3 which has been determined from the detection data Sθ.

The system controller CTL sequentially reads the audio stream DAU stored in the buffer memory 22 for audio playback. When this has resulted in shortage of the audio stream DAU to be read from the buffer memory 22, the system controller CTL performs update processing to update the data in the buffer memory 22. That is, the system controller CTL determines the shortage of the audio stream DAU which is to be read, in accordance with the playback time data DTM delivered from the playback time detecting unit 24. Then, the system controller CTL moves the pickup 15 to the record track of the optical disc DISC on which stored is the data which should be appended to the audio stream DAU stored at the last address in the buffer memory 22. The system controller CTL then causes the pickup 15 to read update data from the optical disc DISC, and the package data made up of the audio stream DAU and the sub-code data DSB to be then stored in buffer memory 22, thereby performing the update processing.

Now, the operation of the information playback apparatus having such a configuration is described below with reference to the flowchart shown in FIG. 9.

Figure 9:
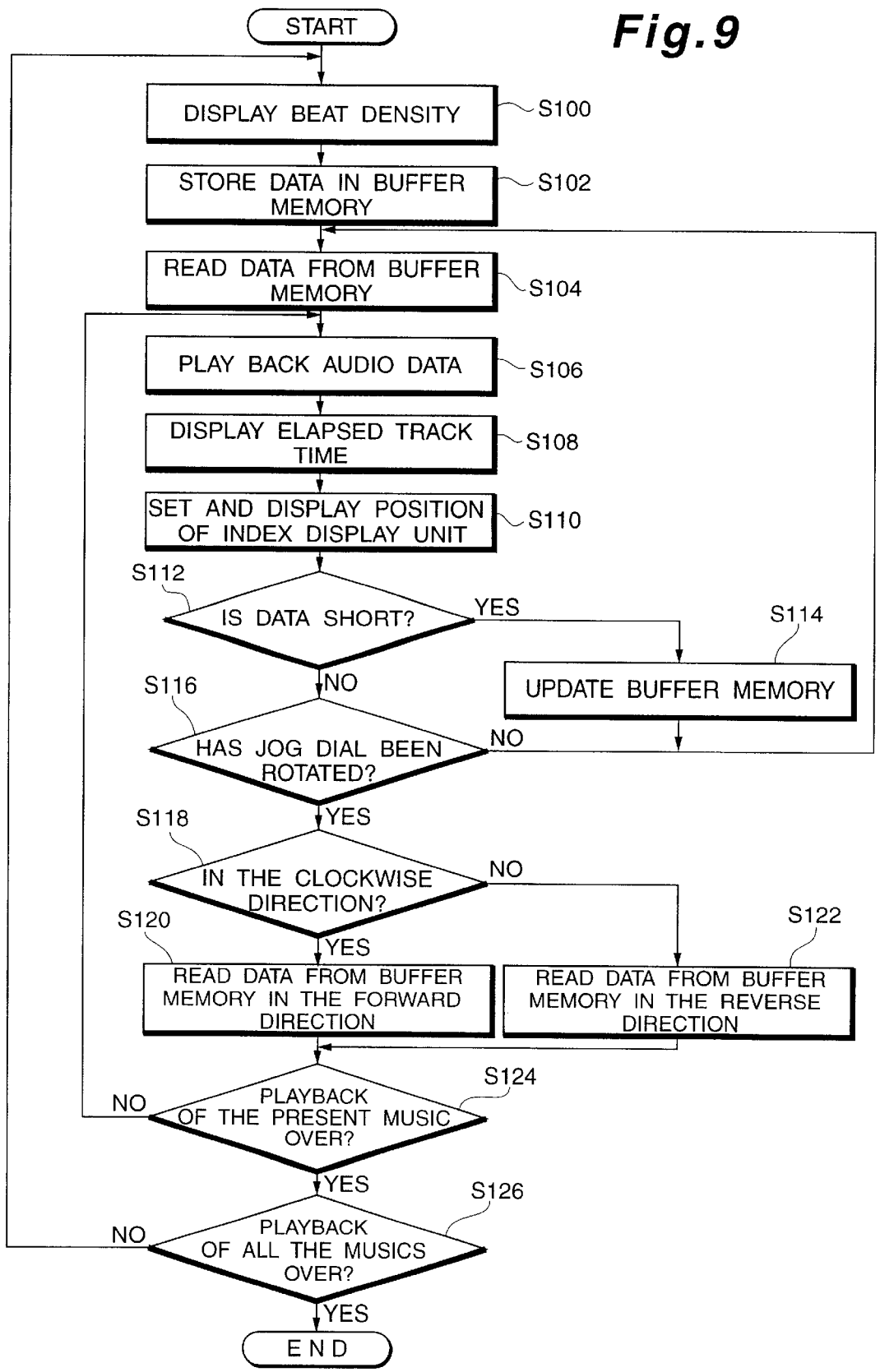
FIG. 9 is an explanatory flowchart illustrating the operation of the information playback apparatus according to the embodiment.

In FIG. 9, the user inserts an optical disc DISC into the disc inlet 5 and then operates the predetermined manipulation key on the control unit 30 to provide an instruction for initiating playback. This causes the disc playback unit 13 to initiate playback operations under the control of the system controller CTL.

First, at step S100, the spindle motor 14 and the pickup 15 are activated to start reading data on the optical disc DISC.

Suppose that the user has provided an instruction for displaying the beat density information through the operation of a predetermined manipulation key. In this case, the data of a music selection to be played back at the beginning is read at high speed, so that the beat density measuring unit 21 measures the beat density in accordance with the audio stream DAU delivered from the decoding unit 19, and then delivers the resulting aforementioned bead density data DBT to the system controller. This causes the beat density data DBT to be supplied to the display unit 2, allowing the beat density information to be then displayed in the predetermined area in the display unit 2, as shown in FIGS. 4 or 5.

Then, at step S102, the normal playback operation is initiated, where reading is started from the data of the music selection, the beat density information of which has been measured. A predetermined amount of data of the audio stream DAU and the sub-code data DSB is stored in the buffer memory 22 as packet data.

Then, at step S104, the packet data which has been stored in the buffer memory 22 is sequentially read from the head address, being supplied to the playback time detecting unit 24, the display position operating unit 25, and the audio signal generating unit 26.

At step S106, this allows the audio signal generating unit 26 to generate an audio signal for producing playback sounds in accordance with the audio stream DAU which is read from the buffer memory 22. Then, at step S108, the playback time detecting unit 24 generates the playback time data DTM indicative of the elapsed track time from the sub-code data DSB to supply the playback time data DTM to the display unit 2. Then, at step S110, the display position operating unit 25 generates from the sub-code data DSB the positional data Drpm indicative of the display position in the index display unit 12 to supply the positional data Drpm to the display unit 2.

As shown in FIG. 2, when the playback time data DTM has been supplied to the display unit 2, a display unit P corresponding in length to the elapsed track time is displayed in the elapsed track time display unit 10, while the index display unit 12 is lit at a position corresponding to the positional data Drpm in the playback speed display unit 11. On the upper portion in the display unit 2, displayed is the elapsed track time in digital form.

Then, at step S112, the system controller CTL determines whether the audio stream DAU stored in the buffer memory 22 and required for playback is short. If true, the process proceeds to step S114, where the buffer memory 22 is updated to have new data, and then continues the processing from the step S104.

If it has been determined at step S112 that the audio stream DAU is not short, the process proceeds to step S116, where the system controller CTL checks the detection data S$\theta$ from the angular velocity detecting unit 31, thereby determining whether the jog dial 3 has been rotated.

At this stage, if the jog dial 3 has not been rotated, the process continues the processing from step S104.

If it has been determined that the jog dial 3 has been rotated, the process proceeds to step S118, where the process determines from the detection data S$\theta$ whether the jog dial 3 has been rotated in the clockwise direction $\emptyset$f or in the counterclockwise direction $\emptyset$r. If it was found that the jog dial 3 was rotated in the clockwise direction $\emptyset$f, the process proceeds to step S120, whereas the process proceeds to step S122 if the jog dial 3 was rotated in the counterclockwise direction $\emptyset$r.

At step S120, the process provides access in the forward direction to the buffer memory 22 to read the data at a timing corresponding to the rotational angular velocity of the jog dial 3 in the clockwise direction $\emptyset$f. This allows the playback time detecting unit 24 to generate the playback time data DTM indicative of the elapsed track time from the sub-code data DSB to supply the playback time data DTM to the display unit 2. This also allows the display position operating unit 25 to generate from the sub-code data DSB the positional data Drpm indicative of the display position in the index display unit 12 to supply the positional data Drpm to the display unit 2. Then, a display unit P corresponding in length to the amount of rotation of the jog dial 3 is displayed in the elapsed track time display unit 10, while the index display unit 12 moves in the clockwise direction $\theta$f by an amount corresponding to the amount of rotation of the jog dial 3, thereby displayed on the playback speed display unit 11.

On the other hand, at step S122 subsequent to step S118, the process provides access in the reverse direction to the buffer memory 22 to read the data at a timing corresponding to the rotational angular velocity of the jog dial 3 in the counterclockwise direction $\emptyset$r. That is, the buffer memory 22 is accessed in the order opposite to that of the memory address.

This allows the playback time detecting unit 24 to generate the playback time data DTM indicative of the elapsed track time from the sub-code data DSB to supply the playback time data DTM to the display unit 2. This also allows the display position operating unit 25 to generate from the sub-code data DSB the positional data Drpm indicative of the display position in the index display unit 12 to supply the positional data Drpm to the display unit 2. Then, a display unit P corresponding in length to the amount of rotation of the jog dial 3 in the counterclockwise direction $\emptyset$r is displayed in the elapsed track time display unit 10. That is, the display unit P is made shorter than it was before the jog dial 3 was rotated in the counterclockwise direction $\emptyset$r. On the other hand, the index display unit 12 moves by an amount corresponding to the amount of rotation of the jog dial 3 in the counterclockwise direction $\emptyset$r, thereby displayed on the playback speed display unit 11. That is, the index display unit 12 moves farther in the counterclockwise direction $\theta$r than it did before the jog dial 3 was rotated in the counterclockwise direction $\emptyset$r.

Then, the process goes back to step S106 to perform subsequent processing (see S124) after having completed the processing at step S120 or S122. When having completely played back one piece of music selection, the process restarts the processing from step S100 to play back the next piece of music selection (see S126). The process then terminates playback operations when all the music selections stored on an optical disc have been played back.

As described above, the information playback apparatus according to this embodiment is designed to display the index display unit 12 during playback of audio data while rotting the index display unit 12 at a speed corresponding to the rpm of an analog record disc. This makes it possible to present to the user the status of playback in a form understandable by intuition.

Furthermore, the entire feature of a music selection is displayed in the form of new feature information or beat density information, thereby making it possible for the user to know the entire feature of the music selection by intuition.

Furthermore, as shown in FIGS. 4 and 5, the beat density information is displayed corresponding to the elapsed track time, thereby allowing the user to readily know where the desired feature portions are located in the music selection.

Furthermore, when the jog dial 3 is rotated by the user, the information playback apparatus of this embodiment displays the index display unit 12 by moving it in the clockwise or counterclockwise direction in response to the rotational direction of the jog dial 3 as well as by setting the amount of movement of the index display unit 12 in response to the rotational angular velocity of the jog dial 3. It is therefore possible to provide just the same feeling of operation as provided by changing the position of a record stylus relative to an analog record disc being played back with an analog record player to initiate playback from the desired location.

In the aforementioned description of the embodiment, the display operation of the display unit 2 for providing playback of MDs has not been included. However, the MD playback unit 29, which is configured in the same way as the disc playback unit 13 for providing playback of CDs and DVDs, is designed to operate the positions of the beat density information and the index display unit 12 which are to be displayed. For this reason, the display operation of the display unit 2 for providing playback of MDs is not explained.

When providing playback of data supplied from a source such as a CD, DVD, or MD, the information playback apparatus of the present invention can display the beat density information and the index display unit 12, described in the embodiment above. Furthermore, the information playback apparatus can also generate the beat density information from a storage medium called a memory card with a semiconductor memory incorporated therein or from audio information such as music selections supplied via radio broadcast or communication media such as the Internet in addition to displaying the index display unit 12.

On the other hand, the process for generating the aforementioned beat density information may be implemented in the form of a computer program, which is stored in various media such as CDs or DVDs to be supplied to users. The program may be installed and executed in an electronic device, such as a personal computer, equipped with an audio playback function. As can be seen in the foregoing, it provides an extra convenience to a wide range of users to offer the same function implemented in the form of a computer program as that of the aforementioned beat density measuring unit 21. Furthermore, it also provides another extra convenience to a wide range of users to offer the same function implemented in the form of a computer program as that of the display position operating unit 25 which is provided for displaying the index display unit 12.

As described above, the information playback apparatus of the present invention provides predetermined display at the display unit by moving and rotating the display along a substantially circular virtual track in the circumferential direction in response to the progress of playback of audio information. This makes it possible for the user to know the status of playback by intuition as if the user was looking at a rotating analog record disc. Thus, the status of playback is displayed to human sense.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An information playback apparatus for displaying a status of playback of audio information to be played back, comprising:

an operating unit for determining a value of a remainder provided by dividing an amount of the audio information to be played back sequentially corresponding to elapsed time by a predetermined value; and a display unit for providing a predetermined display moving along a substantially circular virtual track in a circumferential direction, wherein the display unit provides the predetermined display at an angular position in the circumferential direction associated with the value of the remainder determined sequentially by the operating unit corresponding to the elapsed time, thereby moving the display along the virtual track.

2. The information playback apparatus according to claim 1, wherein the predetermined value is determined based on the amount of information in unit time and a rotational speed of an analog record player.

* * * * *